(12) United States Patent
Maynard et al.

(10) Patent No.: US 6,541,149 B1
(45) Date of Patent: Apr. 1, 2003

(54) ARTICLE COMPRISING MICRO FUEL CELL

(75) Inventors: Helen Louise Maynard, Somerset, NJ (US); Jeremy Patrick Meyers, Springfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/514,494

(22) Filed: Feb. 29, 2000

(51) Int. Cl.[7] .............. H01M 4/86; B05D 5/12; B44C 1/22; G03C 5/00
(52) U.S. Cl. .............. 429/40; 429/41; 429/44; 427/115; 216/43; 430/314; 156/60
(58) Field of Search .............. 429/40, 41, 44, 429/30, 34, 38; 29/623.1, 623.5; 427/115; 438/149; 156/60; 430/313, 314; 216/43

(56) References Cited

U.S. PATENT DOCUMENTS 5,750,013 A * 5/1998 Lin .................. 204/192.14
2002/0020056 A1 * 2/2002 Fonash et al. .............. 29/623.1

FOREIGN PATENT DOCUMENTS

JP 07201348 * 8/1995 .............. H01M/8/04

OTHER PUBLICATIONS

Maynard, H.L. et al., "Silicon tunnels for reactant distribution in miniaturized fuel cells," *to be Published on Internet on Electrochemical Society Site* Feb. 2000. No Date Available.

Meyers, J. P. et al., "Design of miniaturized fuel cells for portable power," *to be Published on Internet on Electrochemical Society site* Feb. 2000. No Date Available.

Tjerkstra, R.W. et al., "Electrochemical Fabrication of Multi Walled Micro Channels," *Proceedings of the uTAS '98 Workshop* (Oct. 1998).

Morse, J.D. et al., "A Novel Proton Exchange Membrane Thin–Film Fuel Cell for Micro–scale Energy Conversion," (1999). No Date Available.

Wilson, M.S. et al., "Low Platinum Loading Electrodes for Polymer Electrolyte Fuel Cells Fabricated Using Thermoplastic Ionomers," *Electrochimica Acta,* vol. 40, No. 3, 355 (1995) No Month Available.

Wilson et al. "Thin–film catalyst layer for polymer electrolyte fuel cell electrodes," *Journal of Applied Electrochemistry,* 22 1–7 (1992).

* cited by examiner

Primary Examiner—Stephen Kalafut
Assistant Examiner—Raymond Alejandro

(57) ABSTRACT

Improved micro fuel cells suitable for portable electrical devices are provided, and processes for forming such cells. In one embodiment of the invention, silicon substrates are used both as the gas delivery structure for the fuel and the oxidant, and as the current collectors. Such use of silicon is advantageous in that it becomes possible both to utilize micromachining and lithographic techniques to form the desired structures, e.g., the gas delivery channels, and also to integrate the fuel cell with silicon-based control circuitry. Advantageously, the silicon substrates comprise both gas delivery tunnels and porous silicon gas diffusion regions formed over the tunnels in the surface of the substrate, i.e., the porous regions over the gas delivery tunnels are integral with the silicon substrate. In another embodiment of the invention, a monolithic structure is employed. In this structure, in contrast to the sandwich-type structure of the previous embodiment, a single silicon substrate—not acting as a current collector—is used, with all flow systems contained therein.

9 Claims, 4 Drawing Sheets

ARTICLE COMPRISING MICRO FUEL CELL

BACKGROUND OF THE INVENTION

1. Field of the Invention

The invention relates to micro fuel cells, i.e., fuel cells useful in small portable devices such as laptop computers and cellular phones.

2. Discussion of the Related Art

Powering of portable electronic devices is a significant issue in today's marketplace, particularly with the increasing use of wireless technologies. While the speed and functionality of many portable telecommunications and computing devices tend to be limited by the power sources, the availability of good power sources is lagging behind development of the electronic devices themselves. Thus, improved power supply and management is constantly being sought.

One of the primary factors for power supply, particularly for portable computers, is the lifetime of the battery between charges. Consumers seek a useful lifetime between charges, e.g., sufficient to power a laptop computer for the duration of a train trip or a plane ride. Yet, consumers also tend to be annoyed by batteries' weight, lengthy recharge times, and expense. Moreover, some types of rechargeable batteries, e.g., nickel-cadmium, contain environmentally undesirable materials and will therefore soon be prohibited from import into Europe. Because of these issues with batteries, some efforts to improve power supply and management have been directed at developing miniaturized fuel cells.

Conventional proton exchange membrane fuel cells, e.g., of the type used for automotive applications, operate as shown schematically in FIGS. 1A and 1B. FIG. 1A shows an exploded view of the cell 10. The cell 10 contains an anode current collector 12 and a cathode current collector 14, both typically formed from a graphite block with machined paths 13, 15 for directing fuel or an oxidant. Graphite cloths 16, 18 are provided to allow for gas diffusion from the current collectors 12, 14 to a centrally-located proton exchange membrane 20 having catalyst films, typically platinum, formed on each side.

As shown in the cross-sectional schematic of FIG. 1B (not to scale), the cell 10 is put together as a sandwich structure. Fuel, e.g., hydrogen gas, moves through the machined paths in the anode current collector 12, diffuses through the graphite cloth 16, and contacts the catalyst layer 17. The catalyst strips electrons from the fuel, the electrons then traveling through external circuit 22. The remaining positive ions travel through the membrane 20 to a second catalyst layer 19, wherein they combine with oxygen ions formed when the free electrons travel from the circuit 22 and combine with an oxidant fed through the machined channels of the cathode current collector 14. The by-products of the process are heat, water, and the electricity generated by the electron flow.

While a body of research exists for large-scale fuel cell stacks that generally provide 10,000 to as high as 250,000 Watts, portable electronic devices require only 0.5 to 20 W. Thus, the existing fuel cell technology has not been designed or optimized for miniaturized fuel cells for portable electronic devices. And efforts to develop fuel cells on this smaller scale have not yet led to any design proven to be feasible and commercially-acceptable.

For example, one effort at an improved design is reflected in J. D. Morse et al., "A Novel Proton Exchange Membrane Thin-Film Fuel Cell for Micro-scale Energy Conversion," presented at American Vacuum Society meeting, Oct. 4, 1999. Morse et al. utilized silicon as a support structure, and photolithographically defined patterned gaps in the silicon for directing fuel to the anode (see FIG. 1 of Morse et al.) After patterning this silicon, the group followed conventional techniques, and formed on the silicon a nickel anode current collector, with gas diffusion holes etched therein (which they refer to as "porous"), a platinum catalyst layer (not shown), an electrolyte layer, a platinum cathode contact layer (not shown) and a silver cathode current collector. While this work is interesting, the results show a relatively inefficient fuel cell that does not suggest a commercially applicable design. Moreover, the nickel and silver in the cell will be subject to attack, and would thereby be expected to dissolve in a relatively short time period.

Thus, improved designs for miniature or micro fuel cells useful for portable electronic devices are desired.

SUMMARY OF THE INVENTION

The invention relates to improved micro fuel cells suitable for portable electrical devices, and a processes for forming the fuel cell. In one embodiment of the invention, silicon substrates are used both as the gas delivery structure for the fuel and the oxidant, and as the current collectors. Such use of silicon is advantageous in that it becomes possible both to utilize micromachining and lithographic techniques to form the desired structures, e.g., the gas delivery channels, and also to integrate the fuel cell with silicon-based control circuitry. In addition, by using silicon substrates as both current collectors and gas delivery structures, the invention achieves a simpler, smaller fuel cell, in contrast, e.g., to the Morse et al. fuel cell, supra, in which the silicon is only a structural member on which a separate metal anode current collector must be formed. In addition to the silicon substrates, the fuel cell of this embodiment of the invention further contains a porous gas diffusion region or regions overlying the gas delivery tunnels, a catalyst layer, and a proton exchange membrane. (As used herein, the term layer indicates either a continuous or a discontinuous, e.g., patterned, layer.)

In one particular aspect of this first embodiment, reflected in FIG. 2D, the silicon substrates comprise both gas delivery tunnels 36 and porous silicon gas diffusion regions 32 formed over the tunnels in the surface of the substrate, i.e., the porous regions over the gas delivery tunnels are integral with the silicon substrate. These channels are generally formed by electrochemically etching the silicon substrate to first create the porous silicon regions along its surface, and then, by changing the processing conditions to move into an electropolishing regime, polishing out the underlying tunnels while the porous regions are left intact. The resultant structure is a porous silicon layer suspended over the tunnel regions. These porous silicon gas diffusion regions are advantageous in that they provide a large surface area over which gas diffusion from the tunnels onto the catalyst layer occurs, e.g., as compared to use of a metal or other film with holes etched therein.

In another embodiment of the invention, reflected in FIG. 4, a monolithic structure is employed. In this structure, in contrast to the sandwich-type structure of the previous embodiment, only a single silicon substrate is required, and this substrate does not act as a current collector. Specifically, as shown in the Figure, the substrate contains independent gas delivery tunnels 84, 86 for the fuel and for the oxidant, a catalyst layer 88, 89, distinct cathode and anode regions, 90, 92, and a proton exchange membrane 94. Benefits of this monolithic structure include simpler fabrication and, because of the exposed surface, improved control of the system hydration.

DETAILED DESCRIPTION OF THE INVENTION

In one embodiment of the invention, a sandwich-structured fuel cell containing silicon current collectors is formed according to the following process.

A silicon substrate is provided, generally <100> oriented, of the desired thickness and area, depending on the particular fuel cell. To provide the requisite conductivity to act as a current collector, the silicon is generally highly p-doped, e.g., to a resistivity of about 10 ohm-cm or less. (As used herein, silicon indicates either doped or undoped silicon.)

Using lithographic techniques, gas delivery tunnels are patterned, and formed. Advantageously, as reflected in FIG. 2A, the substrate 30 comprises porous silicon gas diffusion regions 32 overlying the tunnels 36, although other gas diffusion structures are also possible either as part of or separate from the silicon substrate, e.g., carbon cloth. These tunnel/porous silicon regions are formed, for example, according to an electrochemical etch process such as discussed in R. W. Tjerkstra et al., "Electrochemical Fabrication of Multi Walled Micro Channels," *Proceedings of uTas '98 Workshop*, Kluwer Publishers, 133 (1998). Specifically, the rate-determining step for the electrochemical dissolution of silicon is the concentration of either holes or fluorine-containing ions at the active surface. If there is inadequate fluorine-containing ions at the surface, the trench features will etch more quickly at the top of the feature than the bottom, which tends to create a smooth surface (i.e., polishing). But if the concentration of fluorine-containing ions at the surface is sufficient, the reaction will be limited by the concentration of holes. In such a case, as an initially-smooth surface begins to etch, statistical fluctuations will cause peaks and valleys in the surface.

In p-type semiconductors, the formation of a geometric peak increases the local electric field, forcing holes out of that region. Thus, local etching rate decreases until all the holes are forced out, the etching ceases, and the residual material is no longer conductive. This action forms the network of pores that constitutes the porous silicon. Thus, whether one forms porous silicon or electropolishes the silicon depends on the electrochemical processing conditions, i.e., HF concentration of the etching solution, current density, dopant type, and dopant concentration. Moreover, both reactions—forming orous silicon and electropolishing the underlying silicon—occur isotropically, such that the resulting channel shape is affected. Control runs are capable of being performed to determine appropriate conditions for a given set of parameters.

Figure 1A:
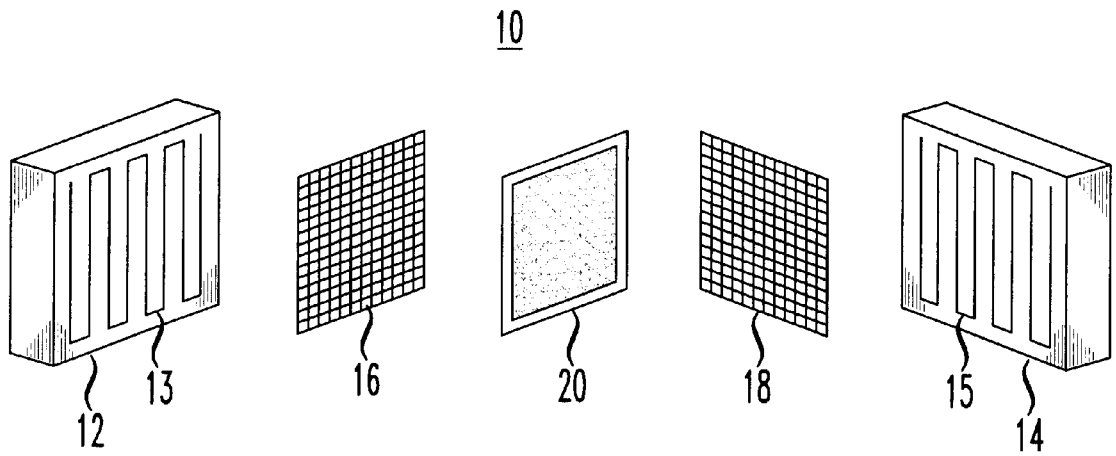
FIGS. 1A and 1B illustrate a conventional fuel cell configuration.
Figure 1B:
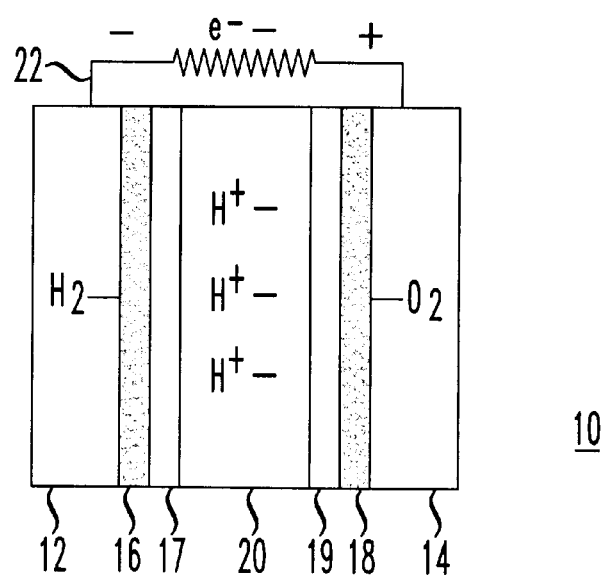
Figure 2A:
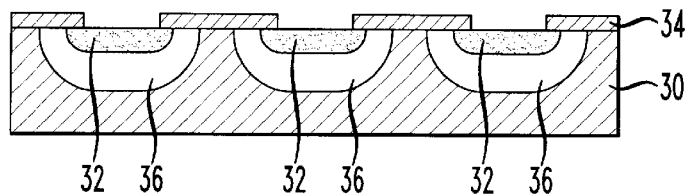
FIGS. 2A and 2D illustrate formation of a fuel cell according to one aspect of the invention.

To create the tunnel/porous silicon structure, the conditions are selected to initially form porous silicon 32 along the surface of the substrate 30, in the desired pattern provided by mask 34, as shown in FIG. 2A. Suitable mask materials include those that do not dissolve in HF, e.g., silicon nitride, gold, and chromium. (For illustrative purposes, only a small region of the overall fuel cell is shown in the Figures.) Then, the conditions are changed to provide electropolishing, to form the gas delivery tunnels 36 underlying the porous regions. (See, e.g., Example 2 below.) A variety of channel patterns are suitable. Typically, serpentine, parallel, wheel and spoke, or fractal patterns are used. The mask 34 typically provides a final structure in which the porous silicon regions 32 are supported—typically by portions of the mask 34 itself. The resulting structure provides porous silicon regions formed in the surface of the substrate, with underlying tunnel regions formed within the substrate, as shown in the Figure.

Figure 2B:
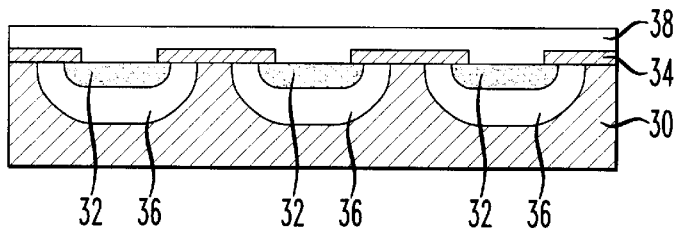

Two such silicon current collector/gas diffusion structures are prepared. Then, as shown in FIG. 2B, a catalyst layer 38 is formed on the silicon structure 30 (on the surface in which the porous silicon regions are formed), for both electrodes. Typically, a catalyst layer of platinum or platinum/carbon (e.g., carbon particles having attached platinum particles) is used. In addition, a platinum/ruthenium catalyst is useful for reacting with methanol fuel. (The Pt—Ru is generally only used for the catalyst layer in contact with the fuel, with a different catalyst used on the oxidant side of the cell.) The catalyst layer is electrically conductive, and is in electrical contact with the silicon current collector. (Electrically conductive means a conductivity of at least 1 ohm$^{-1}$cm$^{-1}$.) The catalyst layer 38 is formed by any suitable technique, e.g., sputtering, or spinning an emulsion of catalyst particles.

Figure 2C:
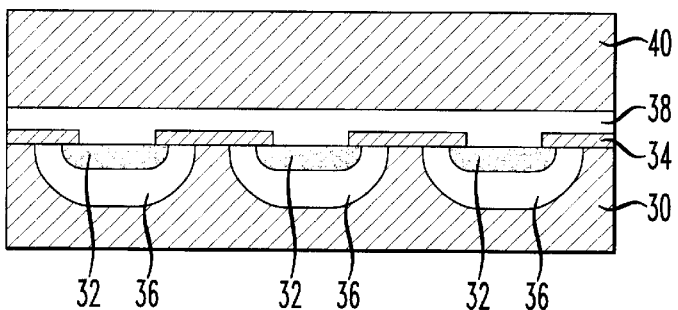

On one of the substrates, a proton exchange membrane 40 is formed on the catalyst layer 38, as shown in FIG. 2C. (Proton exchange membrane indicates any suitable material that allows ions to conduct across it. Forming the proton exchange membrane encompasses in situ techniques such as spin or solution casting, as well as providing a preformed film onto the catalyst.) A typically membrane is Nafion®, sold by Dupont (a perfluorosulfuric acid membrane with a polytetrafluoroethylene backbone). Other films are also commercially available, and are known to those skilled in the art. Typically, the membrane 40 is formed on the catalyst layer 38 by liquid phase techniques, e.g., spin casting or solution casting, or by assembly of a pre-cast film, with typical membrane thicknesses ranging from 10 to 50 μm. In the case of a pre-cast film, the catalyst material is generally painted onto the film, e.g., as an ink containing the catalyst, alcohols, and the membrane polymer.

There is typically no well-defined boundary between the catalyst layer 38 and the membrane 40. For example, in the case of spin or solution casting, the catalyst layer 38 surface generally has some texture, and casting of the membrane layer on such a textured surface causes the ionically conducting polymer to move into such textured regions, e.g., into local valleys of the catalyst layer 38. Painting a catalyst material onto a pre-cast membrane provides a similar result.

Figure 2D:
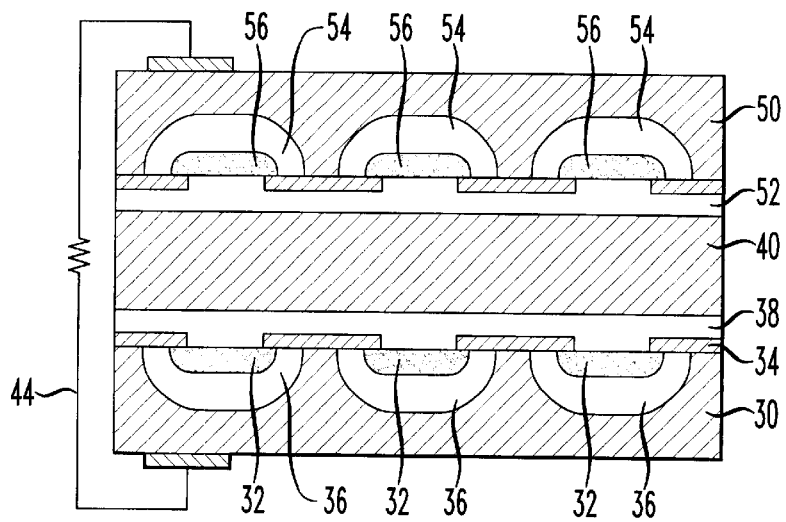

To form the cell, onto this first electrode structure 30/38/40 is placed the other electrode structure 50/52, such that the catalyst layer 52 of the second substrate contacts the proton exchange membrane 40, as shown in FIG. 2D. Generally, a PTFE or solubilized form of the proton exchange membrane is used to bond the catalyst layer 52 to the membrane 40, followed by a heat treatment to drive off alcohol and solvents. (See, e.g., M. S. Wilson et al., "Low Platinum Loading Electrodes for Polymer Electrolyte Fuel Cells Fabricated Using Thermoplastic Ionomers," *Electrochimica Acta,* Vol. 40, No. 3, 355 (1995).)

The fuel cell operates as follows. Fuel, e.g., hydrogen or methanol, is introduced into the first current collector 30 (the anode) by directing the fuel through the tunnels 36, such that it diffuses through the porous gas-diffusion regions 32 to the catalyst layer 38. The catalyst layer promotes removal of electrons (for hydrogen fuel) according to the relationship:

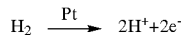

For methanol, the relationship is:

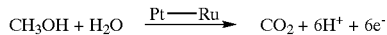

The electrons flow from the catalyst layer 38 through the anode current collector 30 and through an external circuit 44, while the hydrogen ions (i.e., protons) move across the membrane 40 toward the second catalyst layer 52 (the cathode catalyst).

An oxidant, e.g., air or oxygen, is directed into the tunnels 54 of the cathode current collector 50, and diffuses through the gas-diffusion porous regions 56 to the second catalyst layer 52. At this second catalyst layer 52, oxygen from the oxidant reacts both with the hydrogen ions flowing across the membrane 40 and with the electrons flowing to the catalyst layer 52 from the external circuit 44 to form water, according to the relationship:

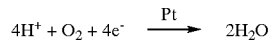

As noted above, this electron flow provides the desired current, and the water by-product is removed from the cell.

The fuel cell also contains fuel and oxidant sources, with valves and control circuitry, and the silicon substrates have access ports to provide the fuel or oxidant into the channels. Techniques for removing the water and heat are also present. For example, water typically diffuses out through the cathode and is carried through flow channels to an exhaust area. Heat transport occurs either by convective cooling (i.e., heat is carried out with the exhaust) or though conduction to a cooling element (e.g., a fins structure on the exterior of the device. A variety of suitable valves, control circuitry, access port structures, and water- and heat-removal techniques are known to those skilled in the art. In addition, with the use of silicon electrodes, access ports are capable of being easily formed by conventional lithographic techniques.)

Figure 3:
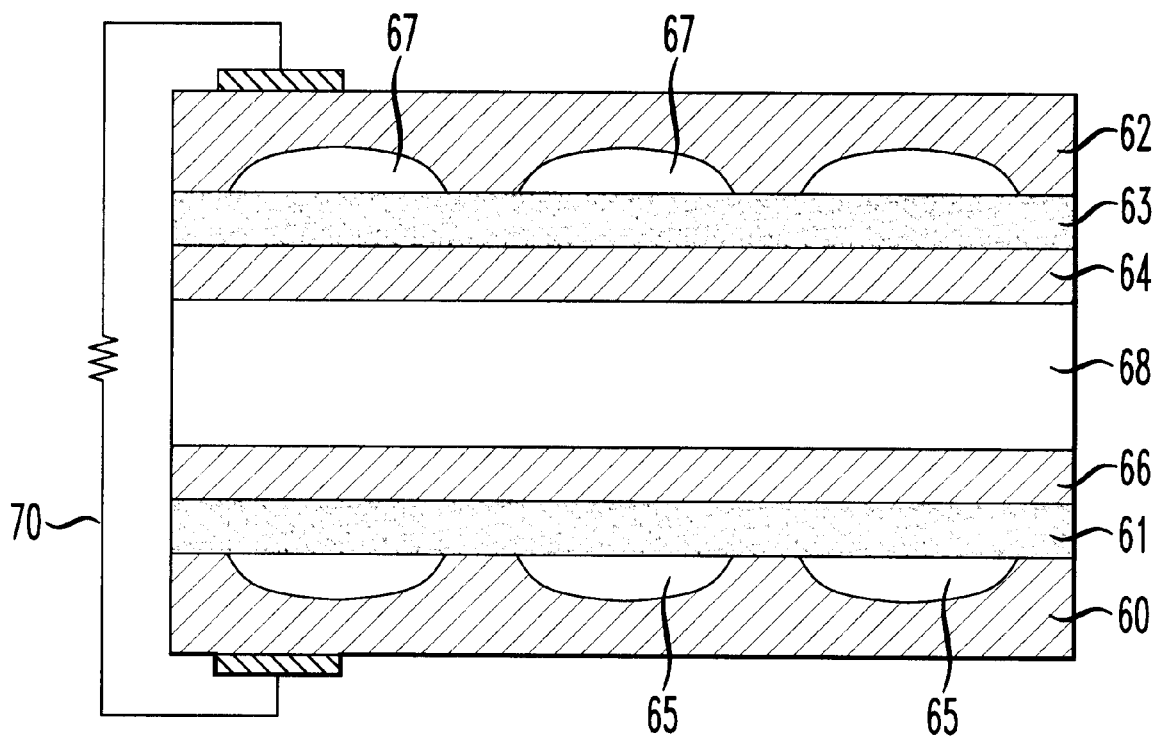
FIG. 3 illustrates a fuel cell according to another aspect of the invention.

Another aspect of a sandwich-type fuel cell using silicon substrates as current collectors is shown in FIG. 3. In this fuel cell, the silicon current collectors contain gas delivery tunnels, but not porous silicon gas-diffusion regions. Instead, a porous gas-diffusion layer is provided between the substrate and the catalyst layer. Specifically, the fuel cell contains silicon substrates 60, 62, the substrates acting as current collectors and containing gas delivery tunnels 65, 67. Porous layers 61, 63 are present on the surfaces of the substrates 60, 62, though which the gas is able to diffuse, and catalyst layers 64, 66 are formed on the porous layers. A proton exchange membrane 68 is present between the catalyst layers. And an external circuit 70 is similarly present.

The catalyst and membrane layers are as described above, as are the anode and cathode (except for the absence of the integral porous silicon regions). The porous layer is any suitable material that allows the fuel or oxidant to diffuse, and is advantageously electrically conductive to allow electrons to freely travel between the catalyst layers and the associated current collector. (As noted above, electrically conductive means a conductivity of at least 1 ohm$^{-1}$cm$^{-1}$.) Suitable materials include highly porous metals, electrically conductive polymers (e.g., polymers containing conductive additives), as well as some xerogel or aerogel-type materials.

The fuel cell operates in the same manner as described above—the only difference being the mechanism by which the fuel and oxidant diffuse from the tunnels 65, 67 to the catalyst layers 64, 66.

Figure 4:
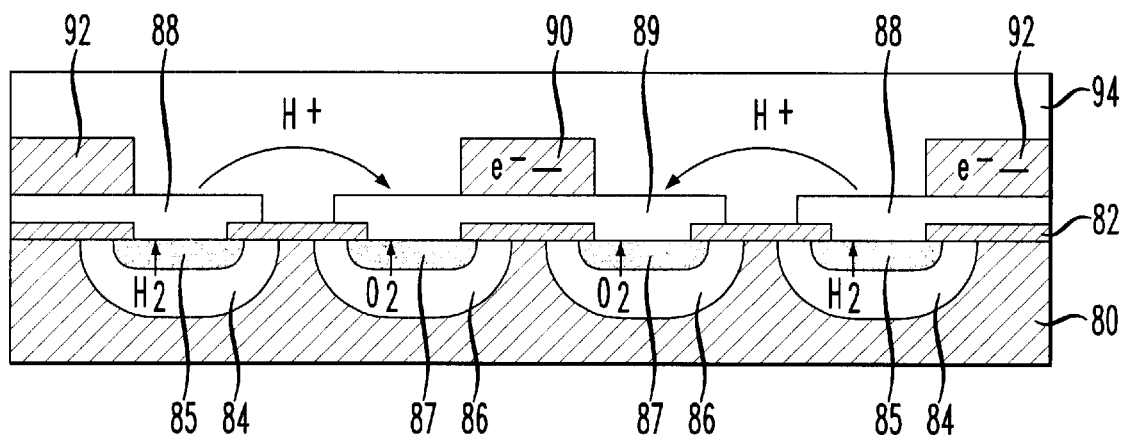
FIG. 4 illustrates a fuel cell according to an additional aspect of the invention.

In another embodiment, a monolithic fuel cell structure is provided, as shown in FIG. 4. In this structure, only a single silicon substrate is used, and the substrate is not used as a current collector. Thus, all flow systems are present in a single substrate. In addition, with the membrane exposed on top of the silicon electrode, control of the hydration of the cell becomes easier. Because conductivity of the membrane is a function of its hydration level, such control is important to keep ohmic losses relatively low. The monolithic design involves a complicated flow pattern and reduces the fraction of the silicon surface available for each reaction. But the simplicity of construction and potential improvement in hydration control makes the design attractive for some applications.

One embodiment of the monolithic fuel cell is formed as follows. As shown in the schematic cross-section of FIG. 4, a silicon substrate 80 is provided, and two independent gas delivery tunnels 84, 86 with overlying porous silicon gas diffusion regions 85, 87 are formed, e.g., using a mask 82 and an electrochemical etch such as discussed above. (Instead of the porous silicon regions, it is possible to include other gas diffusion structures, e.g., a separate porous layer over the gas diffusion channels, such as discussed above.) Some of the tunnels 84 are connected to the fuel source, while other tunnels 86 are connected to the oxidant source. (Independent channels indicates that there are one or more channels for the fuel separate from one or more channels for the oxidant.)

Anode catalyst regions 88 and cathode catalyst regions 89 are then formed on selected portions of the substrate 80 surface. The catalyst regions are formed as discussed above. A cathode current collector 90 and an anode current collector 92 are then formed on the cathode and anode catalyst regions 88, 89, respectively. Typically, a conductive and substantially non-reactive metal, such as gold or platinum, is used to form the current collectors, by any suitable technique, e.g., sputtering or electroplating. The silicon substrate must be isolated from the current collectors to prevent the silicon from creating a short circuit. In the embodiment of FIG. 4, for example, the silicon nitride mask 82 used to form the porous silicon gas diffusion regions is also able to isolate the silicon from the cathode current collector 90 and the anode current collector 92. In other embodiments, similar isolation techniques are possible.

The proton exchange membrane 94, of the type discussed above, is then formed over the entirety of the surface. Other layers are possible to passivate and/or hermetically seal the overall package.

The monolithic fuel cell operates as follows. Fuel is introduced through the tunnels 84 and diffuses through the porous silicon regions 85 to the anode catalyst region 88. At the catalyst, the fuel is oxidized according to the reactions described above. The protons generated by the reaction migrate through the membrane 94 to the cathode catalyst region 89. The electrons generated by the reaction are carried to the anode current collector 92, and are then carried through an external circuit to the cathode current collector 90.

The electrons and protons combine at the cathode catalyst region 89 with oxygen, which is introduced from oxidant tunnels 86 through porous silicon gas diffusion regions 87. The oxygen reduction reaction noted above occurs, and water generated by the reaction diffuses across the porous region 87 to be carrier out through the oxidant tunnels 86 with unconsumed oxygen or the airstream.

The invention will be further clarified by the following examples, which are intended to be exemplary.

EXAMPLE 1

For two wafers, a <100> oriented silicon wafer 25 mils thick was obtained and a 2000 Å layer of $SiN_x$ was deposited by low pressure chemical vapor deposition onto the front and back of the wafer. Using a positive tone photoresist (1813 photoresist obtained from Shipley) and reactive ion etching, a pattern for a front tub was patterned into the $SiN_x$ on the front of the wafer. Gas inlets and outlets were then patterned on the backside of the wafer and etched approximately ¾ of the way through the $SiN_x$ film. Using a standard KOH bath, the front side tub was etched to a depth of 350 μm. A metal stack of Ti/TiN/2000 Å Pt and 5000 Å Au was then sputtered onto the front side of the wafer. A short plasma etch on the wafer back was performed to open up the gas inlet and outlet pattern in the SiNx layer, and a bath of 2:1 water to EDP (ethylene diamine pyrocatechol) was used to extend the gas contact holes into the silicon up to the metal stack. Approximately 6000 Å of negative photoresist was electroplated into the tub, and over the back sides of the contacts, to protect it from a KI etch used to remove the Au layer from the top edges of the front surface of the wafer. The Pt and TiN were removed by ion milling, and Ti was etched with EDTA. The photoresist was then removed, the inlets and outlets were opened, and the wafers were cleaned.

Pieces of a carbon diffusion cloth (Carbon "A" cloth made by E-Tek of Natick, Mass.), 0.35 mm thick, either untreated or 40% wet-proofed, were cut to fit in the front tub of the two prepared silicon substrates. A catalyst-containing ink was painted onto both sides of a 2 to 7 mil thick Nafion® membrane, and the substrates and painted membrane were assembled as a sandwich structure, in the manner described in Wilson et al. "Thin-film catalyst layer for polymer electrolyte fuel cell electrodes," *Journal of Applied Electrochemistry*, 22 1–7 (1992). The assembled test cell was held in place in a test jig that connected the gas fittings to $H_2$ and $O_2$ gas lines. The $H_2$ and $O_2$ gas flow rates, humidification, and back pressure were controlled by a fuel cell test stand, made by Fuel Cell Technologies of Albuquerque, N. Mex. The gas seal around the test cells was made either with just the Silicon/Nafion® interface or with an additional neoprene or Teflon gasket. Electrical contact was made to the gold layer on the silicon pieces and to the graphite cloth layer with Pt wire. The electrical characteristics of the fuel cell were measured with an EG&G Princeton Applied Research Potentiostat/Galvanostat, Model 273, except when the cell produced more current than was suitable for the potentiostat, at which time performance characteristics were measured with simple power resistors and a digital voltmeter (DVM).

Figure 5:
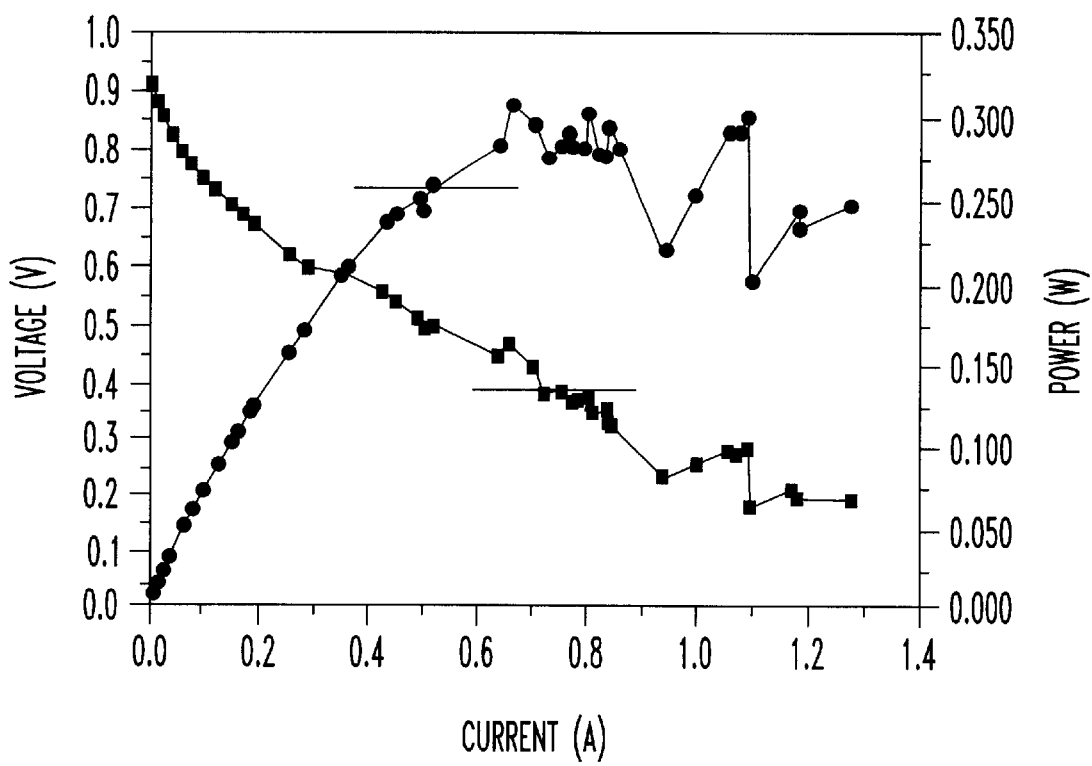
FIG. 5 shows the performance result for a fuel cell containing silicon current collectors.

FIG. 5 shows performance data of the test cell. This data was generated while the fuel cell was at room temperature, and $H_2$ and $O_2$ were flowing at approximately 80 sccm. The flow rate was in excess of what is necessary to operate the cell, due to limitations in the mass flow controllers. No external humidification was used—the only water in the cell was that created by the electrochemical reaction (external humidification is generally useful, however). The noise in the data at currents larger than approximately 0.6 A is due to the fact that the measurements at these higher currents were made with the power resistors and DVM, as noted above. The maximum power produced by the cell was on the order of 300 mW or 61.9 mW/$cm^2$.

EXAMPLE 2

Porous silicon films suspended above electropolished voids were formed in silicon substrates as follows. Boron-doped silicon substrates (about $10^{15}/cm^3$) having a resistivity of about 10 ohm-cm were patterned with a 30 Å gate oxide layer and a 1000 Å polysilicon layer. The substrates were held in a Teflon test jig in a Teflon electrochemical cell. To form the porous silicon regions, the electrochemical cell was filled with a 25% HF solution (1:1 49%HF:ethanol), and a current density of 10 mA/$cm^2$ was applied with a constant current source through platinum electrodes, for 2.5 minutes. The sample was then rinsed in ethanol and kept in an ethanol bath until the electrochemical cell solution was changed. To electropolish the substrates to form the underlying voids, a 2.5% HF solution was used with a current density of 10 mA/cm$^2$, also for 2.5 minutes. Porous films were formed suspended above electropolished regions.

Other embodiments of the invention will be apparent to those skilled in the art from consideration of the specification and practice of the invention disclosed herein.

What is claimed is:

1. A process for forming a fuel cell device, comprising the steps of:
   providing a first silicon substrate;
   forming in a first surface of the first silicon substrate one or more gas delivery tunnels;
   forming a first catalyst layer in electrical contact with the first silicon substrate;
   forming a proton exchange membrane on the first catalyst layer;
   providing a second silicon substrate;
   forming in a first surface of the second silicon substrate one or more gas delivery tunnels;
   forming a second catalyst layer in electrical contact with the second substrate; and
   assembling the first and second silicon substrates such that the second catalyst layer is brought into contact with the surface of the proton exchange membrane opposite the surface of the proton exchange member in contact with the first catalyst layer.

2. The process of claim 1, further comprising the step of forming in the first surface of the first silicon substrate porous silicon regions overlying the gas delivery tunnels.

3. The process of claim 2, wherein the porous silicon regions and the gas delivery tunnels are formed by an electrochemical etch technique.

4. The process of claim 1, further comprising the step of forming a porous gas diffusion layer on the first surface of the first silicon substrate, wherein the first catalyst layer is formed on the porous gas diffusion layer.

5. The process of claim 4, wherein the porous gas diffusion layer is electrically conductive.

6. The process of claim 1, further comprising the step of forming in the first surface of the second substrate porous silicon regions overlying the gas delivery tunnels.

7. The process of claim 6, wherein the porous silicon regions and the gas delivery tunnels are formed by an electrochemical etch technique.

8. The process of claim 1, further comprising the steps of forming a first porous gas diffusion layer on the first surface of the first silicon substrate, and forming a second porous gas diffusion layer on the first surface of the second silicon substrate, wherein the first catalyst layer is formed on the first porous gas diffusion layer and wherein the second catalyst layer is formed on the second porous gas diffusion layer.

9. The process of claim 8, where in the first and second porous gas diffusion layers are electrically conductive.

* * * * *